United States Patent Office 3,642,920
Patented Feb. 15, 1972

3,642,920
PREPARATION OF ALKYL IODIDE FROM ALKYL CHLORIDE BY NUCLEOPHILIC SUBSTITUTION
Morris A. Johnson and Kang Yang, Ponca City, Okla., assignors to Continental Oil Company, Ponca City, Okla.
No Drawing. Filed Dec. 12, 1968, Ser. No. 783,426
Int. Cl. C07c 17/20
U.S. Cl. 260—658 R    5 Claims

ABSTRACT OF THE DISCLOSURE

Propylene carbonate is disclosed as a reaction medium for the preparation of alkyl iodides from the corresponding alkyl chlorides by nucleophilic substitution.

BACKGROUND OF INVENTION

Field of invention

This invention relates to the preparation of alkyl iodides from the corresponding alkyl chlorides by nucleophilic substitution.

DESCRIPTION OF PRIOR ART

It has long been known, Compte Rendus 130, 1191 (1900), that aluminum bromide reacts readily with chlorinated aliphatic hydrocarbons to replace chlorine atoms of the latter with bromine, and certain methods have been proposed for applying the reaction in the manufacture of brominated aliphatic compounds. However, the known methods for carrying out the reaction all involve serious disadvantages.

The reaction requires use of a considerable amount of aluminum bromide which is difficult to prepare, store, and handle in powdered form due to the readiness with which it deteriorates under action of moisture of the air. Also, in the reaction of aluminum bromide with a chlorinated hydrocarbon a thick aluminum chloride-containing sludge is formed which renders stirring of the mixture difficult and necessitates operation in a batchwise manner so as periodically to remove the sludge. Harlow et al. U.S. Pat. 1,891,415 disclose a method wherein bromine is reacted with aluminum in a closed system to form molten aluminum bromide, and the latter is fed directly into reaction with a chlorinated hydrocarbon to form a brominated organic product. This method avoids the difficulties earlier encountered in preparing and handling powdered aluminum bromide, but it does not avoid sludge formation during the reaction of the aluminum bromide with the chlorinated hydrocarbon. Nutting et al. U.S. Pat. 2,120,675 have shown that the troublesome sludge formation may be avoided by first dissolving the aluminum bromide in an inert solvent such as ethyl bromide, and feeding the solution into reaction with the chlorinated aliphatic hydrocarbon. The large proportion of inert solvent which is employed reduces, of course, the productive capacity of a reactor of given size and the presence of the solvent necessitates extra steps of removing the aluminum compounds dissolved in the reacted mixture and of separating and recovering the solvent. When using aluminum bromide as a reactant in accordance with any of the known methods just discussed, the reaction tends to stop far short of complete consumption of one or both reactants, presumably because of a chemical equilibrium between the reactants and the products.

Lake et al. U.S. Pat. 2,553,518 disclose that halides of aluminum and boron are effective catalysts in the reaction between hydrogen bromide and certain chlorinated organic compounds to replace chlorine of the latter with bromine atoms, and thereby produce brominated organic compounds. Also, the preparation of alkyl iodide from the corresponding chloride by nucleophilic substitution using acetone as a solvent is well known (see, "Organic Chemistry," L. F. Fieser and M. Fieser, D.C. Health and Co., Boston, 1944). In this acetone solvent, however, the chloride ion-iodide ion exchange reaction cannot be carried out with a reasonable rate because iodide salts are nearly insoluble in acetone.

SUMMARY OF INVENTION

According to this invention propylene carbonate is utilized as a solvent for an iodide ion source in the nucleophilic substitution of the chlorine from an alkyl chloride with iodide ion.

DETAILED DESCRIPTION

In carrying out the process of this invention propylene carbonate is used as a solvent for an iodide salt which reacts with an alkyl chloride by substituting iodide for the chloride of the alkyl chloride.

The preferred method of carrying out this invention is by heating a mixture of an alkyl chloride and propylene carbonate for several hours in a closed vessel with excess alkali iodide to yield the corresponding alkyl iodide product. The simplicity of apparatus and cleanliness of reaction make the process industrially attractive. Some advantages of the propylene carbonate solvent system are:

(1) Propylene carbonate is very high boiling (B.P. 117° C. at 17.5 mm. Hg$_5$).

(2) Propylene carbonate is not miscible with water.

(3) The dielectric constant of propylene carbonate is about three times that of acetone.

(4) Solubility of certain electrolytes useful in electrochemistry is quite good.

(5) The propylene carbonate/iodide solution does not discolor under the conditions studied indicating greater stability than the respective acetone and alcoholic solutions which are observed to discolor.

(6) While propylene carbonate shows reactivity toward amines and compounds with active hydrogens such as phenols, alcohols, and carboxylic acids in the presence of a basic catalyst at elevated temperature (100–200° C.) the conditions described below result in reasonably fast reactions with no detectable side products. This can be an advantage over the acetone or ethenol systems in those cases where iodoform reaction is possible.

(7) Propylene carbonate has a low acute oral toxicity and there is no problem from ingestion incidental to its handling and use. Propylene carbonate presents no problem from a single exposure to the vapor or fumes at room temperature or when heated to 100° C.

Temperature and pressure as well as reaction times can vary over a wide range with the generalization, as shown by the examples, that higher temperatures and longer reaction times result in more complete reaction.

The alkyl chlorides which are suitable for this process are those having from about 1 to about 12 carbon atoms. Some alkyl chlorides which are suitable for this process are methyl chloride, ethyl chloride, propyl chloride, butyl chloride, pentyl chloride, hexyl chloride, heptyl chloride, octy chloride, nonyl chloride, decyl chloride, undecyl chloride, and dodecyl chloride.

This process is particularly suitable for producing ethyl iodide from ethyl chloride and methyl iodide from methyl chloride.

The iodide ion source for this process should be one which is more soluble in propylene carbonate than the corresponding chloride compound. The alkali metal iodide salts are particularly useful in this process with sodium iodide being the preferred iodide ion source.

The following examples illustrate the process of this invention:

EXAMPLE I

A mixture of 100 g. propylene carbonate, 20 g. sodium iodide, and 8.47 g. ethylchloride was stirred at ambient temperature in a tightly closed vessel for 17 hours. The reaction mixture was washed with 35 cc. of water to eliminate the fine suspension of sodium chloride which had appeared. The combined aqueous and organic solutions were extracted with 25.0 cc. n-hexane and the product was analyzed by V.P.C. using a T.C.P. column at 110° C. After determining peak height for the reaction mixture extract, a weighed amount of ethyliodide was added to the combined reaction mixture, water, and n-hexane and this was thoroughly shaken and the n-hexane layer was again examined by V.P.C. Finally a second weighed portion of ethyliodide was added and the V.P.C. peaks were again measured. The three peak heights were nearly linear when plotted versus amount of ethyl iodide; yield of 4.2 g. ethyliodide was calculated.

EXAMPLE II

A mixture of 100 g. propylene carbonate with 20 g. sodium iodide and 10.65 g. ethylchloride was stirred for 15½ hours in a tightly closed vessel in an oil bath kept at 60° C. After cooling the reaction mixture was shaken with 25.0 cc. n-hexane and the product was analyzed by V.P.C. as above. Yield 23.6 g. ethyliodide, (92 percent).

EXAMPLE III

A mixture of 100 g. propylene carbonate with 20 g. sodium iodide and 9.95 g. ethylchloride was stirred for 15¼ hours at 100° C. as described above. Yield 21.4 g. (89 percent) ethyliodide.

Have thus described the invention, by providing specific examples thereof, it is to be understood that no undue restrictions or limitations are to be drawn by reason thereof and that many modifications and variations are within the scope of the invention.

What is claimed is:

1. A method of preparing an alkyl iodide from the corresponding alkyl chloride comprising reacting said alkyl chloride with an alkyali iodide salt in a solvent of propylene carbonate.

2. The method of claim 1 wherein said alkali iodide is sodium iodide.

3. The method of claim 1 wherein the alkyl group of said alkyl chloride has from about 1 to about 12 carbon atoms.

4. The method of claim 4 wherein said alkyl chloride is ethyl chloride.

5. The method of claim 4 wherein said alkyl chloride is methyl chloride.

References Cited

FOREIGN PATENTS

| | | | |
|---|---|---|---|
| 354,291 | 10/1905 | France | 260—658 R |
| 1,441,233 | 4/1966 | France | 260—658 R |

LEON ZITVER, Primary Examiner

J. A. BOSKA, Assistant Examiner